United States Patent [19]

Blaney

[11] Patent Number: 4,522,280

[45] Date of Patent: Jun. 11, 1985

[54] AUTOMATIC DISENGAGEMENT DEVICE FOR AUTOMOTIVE CRUISE CONTROL SYSTEM

[75] Inventor: Peter G. Blaney, Walnut Creek, Calif.

[73] Assignee: Zemco, Inc., San Ramon, Calif.

[21] Appl. No.: 389,684

[22] Filed: Jun. 18, 1982

[51] Int. Cl.[3] .............................................. B60K 31/00

[52] U.S. Cl. .................................... 180/175; 180/179; 307/471

[58] Field of Search ............... 180/179, 178, 177, 176; 307/471

[56] References Cited

U.S. PATENT DOCUMENTS 3,455,411 7/1969 Carp .................................. 180/176

4,084,659 4/1978 Abend .................................. 180/179

4,158,192 6/1979 Muto .................................. 180/177

FOREIGN PATENT DOCUMENTS 128968 11/1978 Japan .................................. 307/471

*Primary Examiner*—Joseph F. Peters, Jr.

*Assistant Examiner*—Joseph G. McCarthy

*Attorney, Agent, or Firm*—Owen, Wickersham & Erickson

[57] ABSTRACT

A device for automatically disengaging an automotive cruise control system whenever one or more failures or malfunctions occur in the vehicle brake system and also if such a malfunction should occur when the vehicle is in the "resume speed" mode of the cruise control system. The device comprises an exclusive NOR circuit whose two symmetrical input terminals are connected to opposite sides of the brake switch in series with the vehicle power source. The output from the exclusive NOR circuit is connected to a logic control circuit and through a control resistor to a vehicle power lead. Any malfunction of the brake circuit when the cruise control is in operation will cause the exclusive NOR output to go from a relatively low to a relatively high potential thereby causing a logic control circuit to provide a disconnect signal to a throttle actuator. An additional safety factor is attained by connecting the control resistor to the base of a transistor in a power lead to the throttle actuator. A third safety factor is provided in a redundant brake circuit portion of the logic control wherein a peak speed register is provided to enable a constant comparison with actual speed so that an abnormal fall-off of speed below a preselected level in the "resume mode" of the cruise control can be detected and cause a disconnect signal.

2 Claims, 3 Drawing Figures

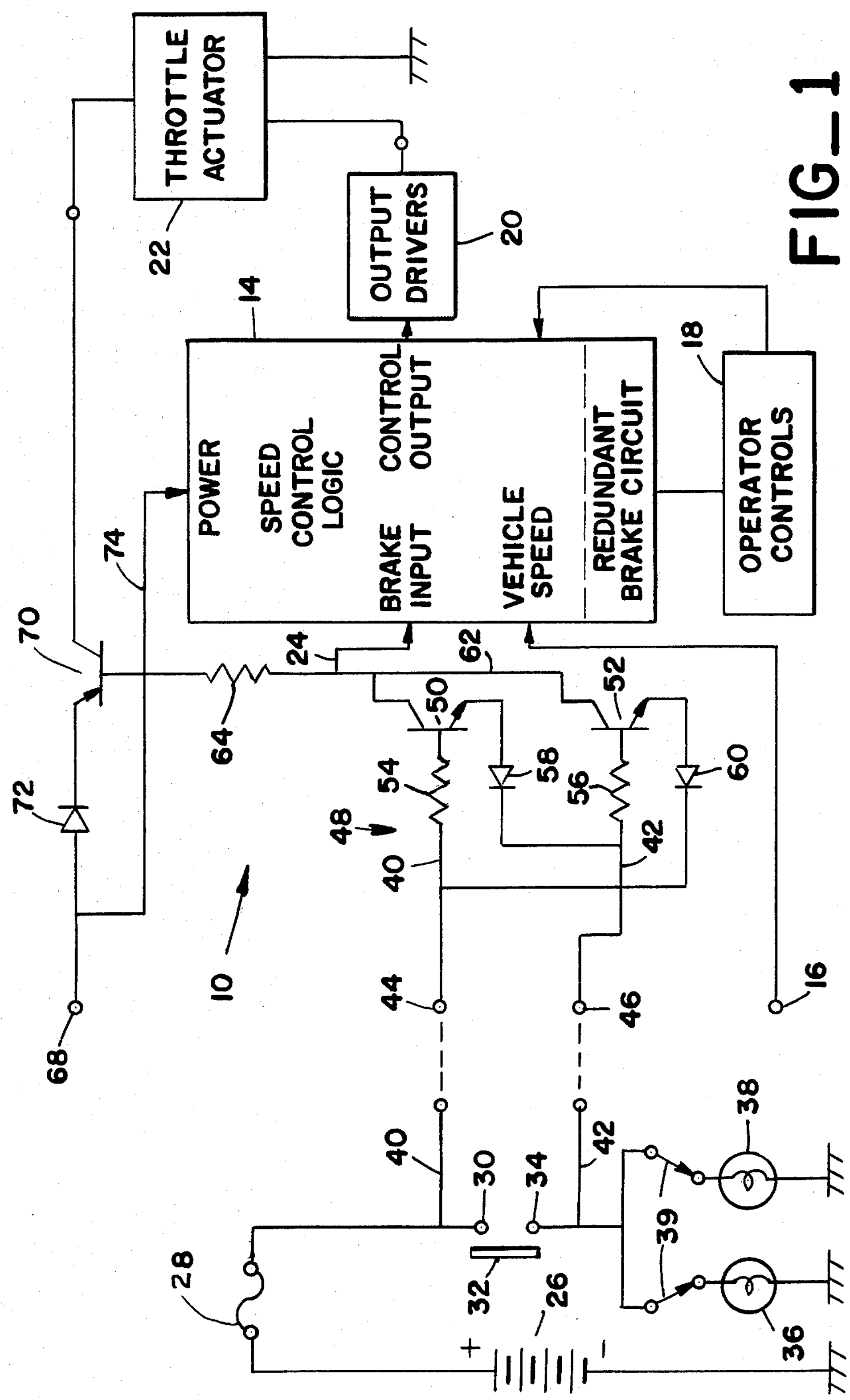
FIG_1

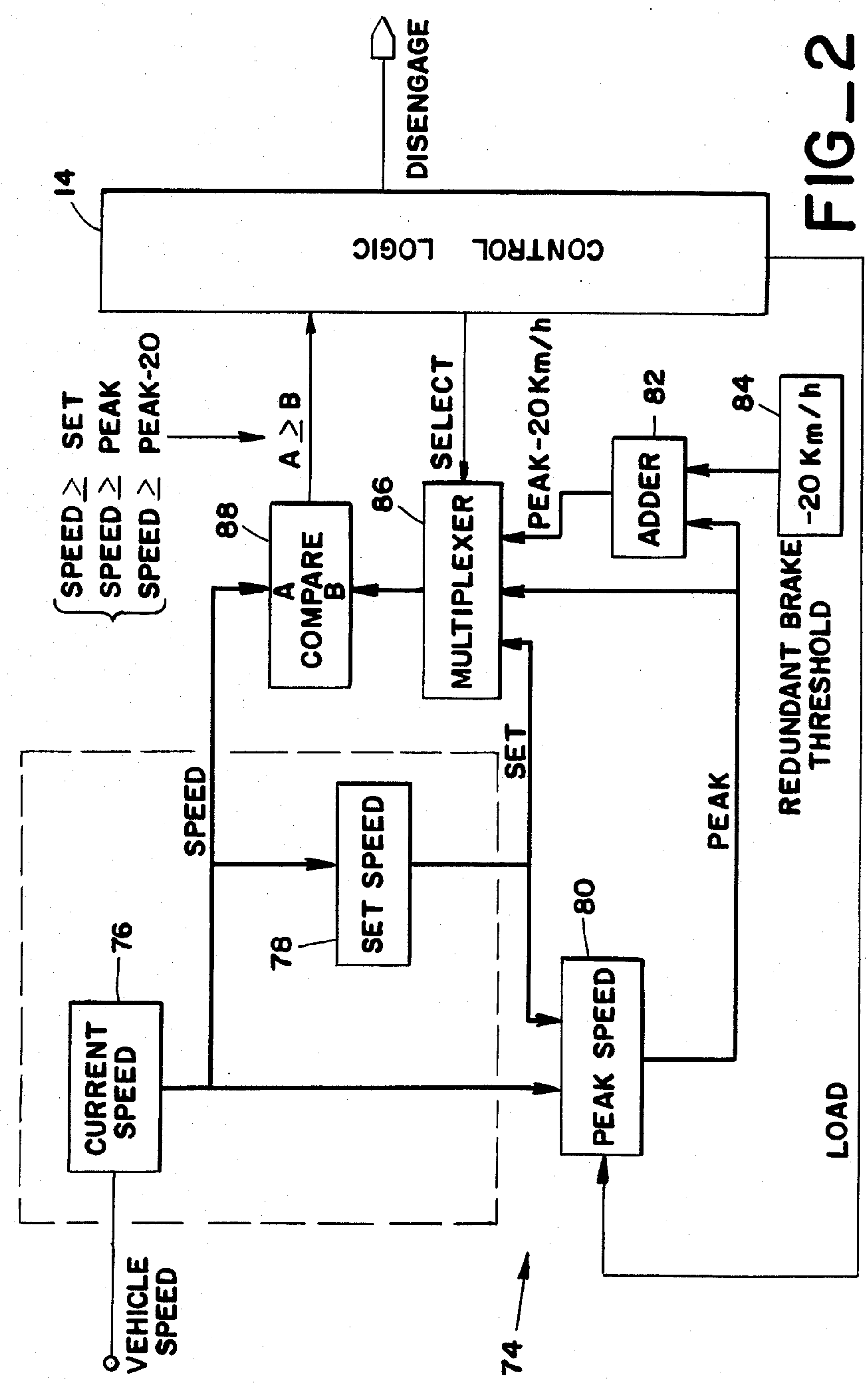
FIG_2

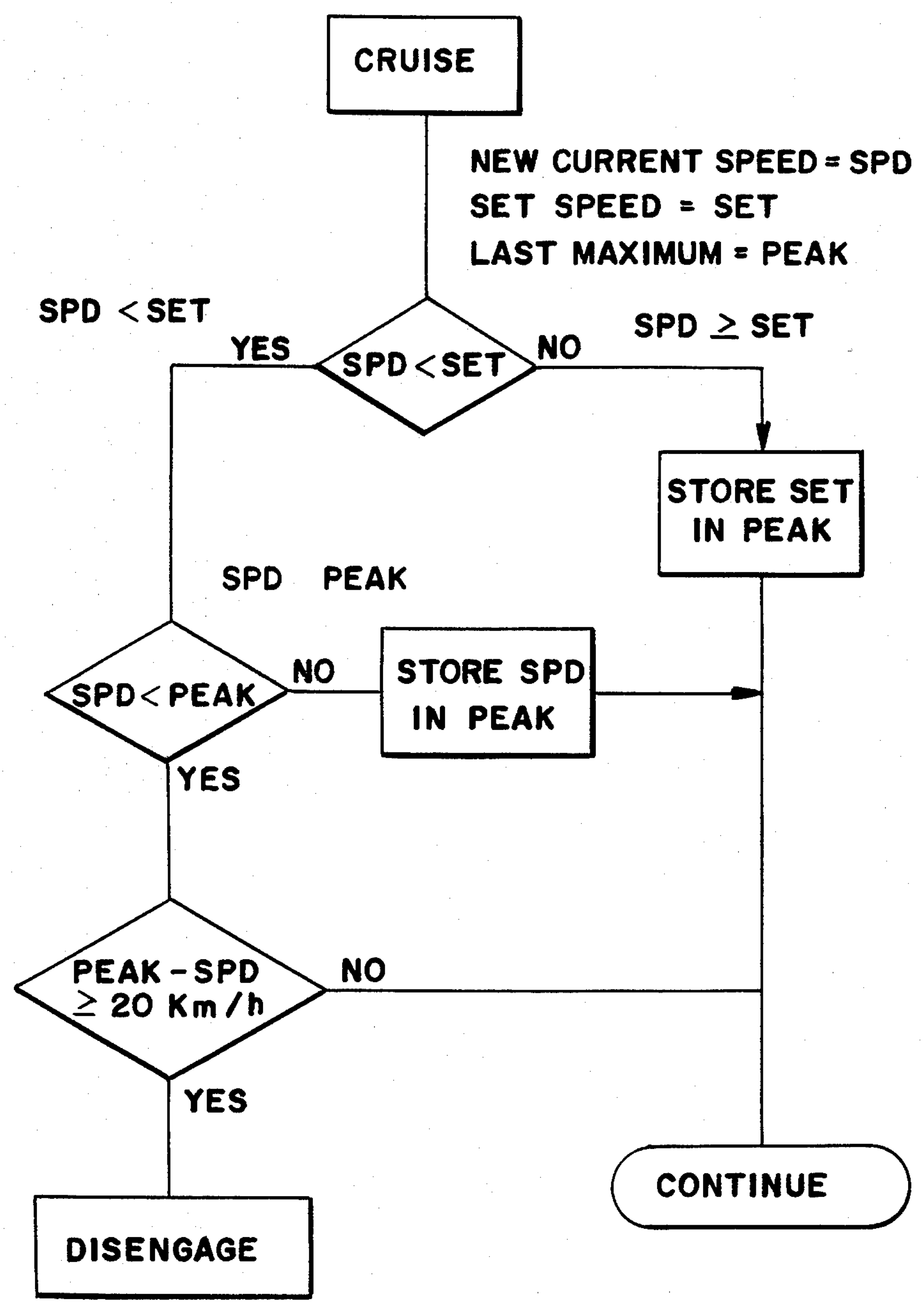
FIG_3

AUTOMATIC DISENGAGEMENT DEVICE FOR AUTOMOTIVE CRUISE CONTROL SYSTEM

This invention relates to automatic speed controls for vehicles and more particularly to an improved safety device for disengaging such a speed control automatically as required under certain vehicle operating conditions.

BACKGROUND OF THE INVENTION

Automatic speed control or so-called cruise control devices have been widely used on vehicles, particularly automobiles. In general, they comprise a direct throttle connection controlled by an electronic circuit utilizing an actual speed sensor input such as a device that measures the rpm's of the vehicle driveshaft. Normally, once the speed control is activated, it is deactivated only by a direct switch-off or by activation of the vehicle brake.

For various safety and economic reasons, all automatic speed controls heretofore devised are intended to disengage when the vehicle brake is applied. That is, they will disengage if everything in the vehicle brake circuit and the speed control circuit functions properly. However, the method of detecting the application of the vehicle brake and the lack of an adequate functional safety backup in prior cruise controls greatly decreased their overall safety and reliability. Prior to the present invention, no cruise control system available could insure that no conceivable combination of failures could occur in the vehicle brake circuit or in the speed control that would prevent the speed control from becoming disabled when necessary.

Typical prior art speed control systems detect the brake application by attaching a single wire to the lamp side of the vehicle brake switch. When the brake is applied, this wire becomes "hot" and sends a signal to the speed control circuit to disengage. This method of brake detection is simple but highly unreliable. For example, if the vehicle is towing a trailer, it is not uncommon for the extra load on the brake and turn signal circuits to occasionally blow the fuse. If this happens, when the brake is applied, there will be no "hot" signal to the speed control and it will remain engaged. As the vehicle slows down, the speed control will attempt to regain the speed by opening the throttle. In addition, the extra weight of the trailer reduces the vehicle's braking capacity, creating a very dangerous situation. One suggested solution to this problem was to add a second independent switch to the brake pedal. This was satisfactory for demonstrations but the number of mechanical adaptors required for after-market installations made it unmanageable. A more practical solution was to monitor the "hot" side of the brake switch to determine if the fused side of the circuit was in proper order. However, this alone was still not sufficient because the connections to the brake wires were typically made with wire tap connectors that snap over the wires and pierce the insulation with a sharp point or knife edge. While these connectors were usually quite reliable, they often failed. For example, if the installer did not use the proper size connector, the connectors often popped off (if the connector was too small) or made intermittent contact (if the connector was too large). Also, in the case of the above circuit, if the hot wire connector failed, then the cruise control would disengage, but if the lamp connector failed, there was no signal to send to the control to disengage it.

Another possibility for failure which arose in prior cruise control systems, although less common than either of the above two failures, was that the switch itself would jam, freeze, or physically break. This prevented the brake signal from getting to the speed control circuit even though the remaining circuits were in working order. To detect the application of the brake when the electrical circuits had failed, an auxillary "redundant brake" circuit was added to detect the deceleration of the vehicle below the desired cruise speed by a preset threshold. At least one prior art design used this approach to create a redundant brake detection, but had the disadvantage of becoming disabled in the resume mode, that is, a situation where the vehicle slowed down below its set speed and then attempted to regain that set speed. Since the resume mode can be selected well below the redundant brake threshold, it must be disabled to allow the vehicle to return to the cruise speed. However, the most vulnerable time for a brake circuit malfunction is immediately after slowing down or coming to a stop and then selecting the resume mode. This is the time the redundant brake is needed the most.

It is, therefore, an object of the present invention to provide a cruise control disengaging system on a vehicle that will monitor the state of the vehicle brake system and automatically disengage the speed control should the brake fuse burn out.

Another object of this invention is to provide a system that will monitor the state of a vehicle brake system and disengage the speed control of the vehicle should any of the wires become disconnected.

Yet another object of this invention is to provide a system that will monitor the speed of the vehicle at all times to provide a redundant brake detection should the vehicle brake circuit fail in such a way that the aforementioned portions of the system become ineffective.

Another object of this invention is to provide a redundant brake system that will function equally as well in the resume mode as it does in the cruise mode.

SUMMARY OF THE INVENTION

In accordance with the present invention the aforesaid objects are accomplished by a system utilizing an exclusive nor circuit connected to a conventional brake switch and in combination with a speed control logic circuit that provides output control signals to a throttle actuator for the cruise control system. The exclusive nor circuit provides a first level of safety by functioning to assure that actuation of the brake switch or malfunction of the brake switch will produce a cruise control disconnect signal from the logic circuit. A second level of safety factor is provided by a power control transistor in the power lead to the throttle actuator and this latter transistor is also controlled by the exclusive nor circuit. A third level of safety control is provided by monitoring vehicle speed changes in the resume mode, that is, when the vehicle is in the process of regaining speed toward a preselected set point and also thereafter. This aspect of the invention is accomplished by the addition of a peak speed register to store the maximum value of the vehicle's actual speed. A comparator is then used to compare the vehicle's present operating speed with the stored peak speed. If the operating speed is more than a predetermined threshold below the peak speed, then an automatic disconnect signal is furnished to the cruise control system.

Other objects, features and advantages of the invention will become apparent from the following detailed description of one embodiment thereof presented in conjunction with the accompanying drawing.

BRIEF DESCRIPTION OF THE DRAWING

FIG. 1 is a combined circuit and block diagram of a cruise control system with a safety disengagement device according to the invention, shown in combination with a vehicle brake circuit;

FIG. 2 is a block diagram of the redundant brake circuit portion of the safety disengagement device according to the invention;

FIG. 3 is a flow chart illustrating the operation of the control logic section for the redundant brake circuit.

DETAILED DESCRIPTION OF EMBODIMENT

With reference to the drawing, FIG. 1 shows a disconnect circuit 10 forming part of a safety disengagement device for an automotive speed or cruise control system according to the present invention in combination with a typical automotive brake circuit 12. As shown in diagrammatic form, the speed control system comprises generally a central logic unit 14 that receives one signal input from a speed sensor 16. Such a sensor (not shown) supplies speed related pulses derived from a suitable source such as magnets on the drive shaft, or from the engine ignition system, or from the speedometer cable. The logic unit also receives input signals from the vehicle operator by a source designated operator control 18 for setting the desired vehicle speed. Output signals from the logic unit are supplied through output drivers 20 which furnish control input to a suitable throttle actuator 22 providing primary power for moving the engine throttle (not shown).

Another input to the logic unit 14 is supplied from the disconnect circuit 10 through a lead 24 so that the speed control system will be automatically disabled whenever the vehicle brakes are activated. As will be shown from the following description, the present invention assures that the brake system be reliably effective for this disabling purpose despite any malfunction of its components.

In the brake circuit 12 for a typical vehicle, as shown in FIG. 1, power is supplied from the positive terminal of a battery 26 through a fuse 28 to one contact 30 of a brake switch 32. The other switch contact 34 supplies power to left and right brake lamps 36 and 38 through a turn signal switch 39. The brake circuit is completed by a ground return from the lamps 36, 38 to the negative terminal of the battery. The contacts of the brake switch 32 are open when the brake pedal (not shown) is at rest and are closed when the brake pedal is depressed.

The brake circuit is connected to the disconnect circuit 10 by a pair of leads 40 and 42 which extend from opposite sides of the brake switch 32 through a pair of contacts 44 and 46, respectively. The latter contacts are input terminals for an exclusive nor logical circuit 48 which is comprised of a pair of NPN transistors 50 and 52. The input terminal 44 is connected through a resistor 54 to the base of transistor 50, and the input terminal 46 is connected through a resistor 56 to the base of transistor 52. The emitter of transistor 50 is connected through a diode 58 to the lead 42 between contact 46 and resistor 56. The emitter of transistor 52 is connected through a diode 60 to the lead 40 between contact 44 and resistor 54. The collectors for both transistors are connected in parallel to a lead 62 that connects to the lead 24 which is connected to the speed control logic circuit 14. The lead 62 also extends through a resistor 64 to the base of a PNP transistor 70 in a power lead 66 extending from the vehicle accessory bus 68 to the throttle actuator 22. A branching lead 74 extends from the accessory bus to a power input terminal on the logic control unit 14. The power lead 66 is connected through a diode 72 to the emitter of transistor 70 whose collector is connected directly to the throttle actuator, so that the transistor acts as an on-off switch in the power lead.

With the terminals 44 and 46 serving to interconnect the control circuit 10 with the brake circuit 12, the system will function in the following manner: the terminal 44 is normally held at battery voltage by power from the battery through the fuse 28 while terminal 46 is held near ground potential by the low impedance of the cold brake lamps 36 and 38. Thus, terminal 44 supplies base current to transistor 50 through resistor 54 and also through diode 58 turning the transistor on. Since diode 60, connected to the emitter of transistor 52 is reversed biased, it prevents this transistor from turning on, and since transistor 50 is on, the signal at the output in lead 24 is low. Now, when the brake pedal is depressed, the brake switch 32 is closed and terminal 46 is pulled up to battery voltage (e.g., 14 volts). Since both diodes 58 and 60 are now reversed biased, both transistors 50 and 52 are off and because there is no ground return path, the output in lead 24 is pulled high through the resistor 64 by the emitter-base leakage current of transistor 70.

If terminal 44 becomes disconnected, the base bias for transistor 50 is removed, thereby turning it off and allowing the output in lead 24 to be pulled high through resistor 64. If terminal 46 becomes disconnected, the ground return for the base drive of transistor 52 is removed, again allowing the output put in lead 24 to be pulled high through 64. The resistor 56, transistor 52 and diode 60 are complementary to resistor 54, transistor 50 and diode 58. Thus, the exclusive nor circuit 48 is symmetrical so that even if terminals 44 and 46 were interchanged, the circuit would function in the same manner to provide a disconnect. The output in lead 24 will be low if and only if one of the terminals 44 or 46 is held high while the other is held low. If both are high or both are low, the output in lead 24 will be high and as an input to the speed control logic circuit, it will cause the speed control system to disengage.

An additional level of safety redundancy is provided by the power switching transistor 70 in the lead 68 which is switched on by base current through resistor 64 when the signal in output lead 24 is held low by either transistor 50 or 52. When any external conditions (as described above) cause the output of the "Exclusive NOR" circuit 48 to go high, a brake input to the speed control circuit is generated and the base bias to transistor 70 will be removed thereby removing power from the throttle actuator and allowing the throttle to return to its idling position. Should the speed control circuit fail to recognize the brake signal, the speed control system will still be disabled by the removal of the primary actuator power, normally furnished in power lead 68 from the vehicle accessory bus.

The system described above will circumvent any failure of the speed control circuit or the vehicle brake system wiring and fuses except for failure of the brake switch itself. To add an additional measure of security, it is desirable to provide for detection of vehicle deceleration below the set cruise speed and also to detect vehicle deceleration while in the resume mode, that is when the vehicle is supposed to be automatically increasing its speed toward a preselected cruise set point. This is accomplished by what is called a redundant brake circuit 74 which is shown in block diagram form in FIG. 2. As shown, this circuit, which may be part of the logic control unit 14, comprises a "current speed" register 76 which stores the current vehicle speed from the speed sensor 16. A set speed register 78 is also provided to store the preselected vehicle speed used for the cruise control. A "peak speed" register 80 is connected to the current speed register and stores therefrom the maximum value of the current speed on a continually updated basis. An adder 82, connected to the peak speed register, is provided to compute the peak speed less an arbitrary speed constant (e.g., 20 kilometers/hour) supplied by a suitable threshold generator 84. The adder is connected to a multiplexor 86 which also receives inputs from the set speed and peak speed registers 78 and 80. The multiplexor output is connected to a comparator 88 which also receives a current speed input and whose output is furnished directly to the control logic circuit for the cruise control system.

Following the flow chart of FIG. 3, the control logic 90 for the redundant brake circuit operates as follows:

First, the current speed is compared to the set speed by selecting the appropriate input to the multiplexor. If the current speed is greater than or equal to the set speed, the set speed is loaded into the peak speed register and the cruise control system is not disengaged.

If the current speed is less than the set speed, the multiplexor is switched to direct the peak speed input to the comparator. If the current speed is greater than or equal to the peak speed, the current speed is stored into the peak speed register and the cruise control system is not disengaged.

If the current speed is less than the set speed and the current speed is less than the peak speed, then the third input to the multiplexor is selected to compare the current speed with the peak speed less 20 km/h. If the current speed is greater than or equal to the peak speed less 20 km/h, then the cruise control system is not disengaged, but if the current speed is less than the peak speed less 20 km/h, then the cruise control will be disengaged.

The net result of this operation is to store in the peak register the maximum value of the vehicle's current speed which is not greater than the set speed. Then if the vehicle begins to slow down, the current speed is compared to the maximum peak speed. If the vehicle loses more than 20 km/h (or any other desired threshold value) the cruise control system is disengaged.

From the foregoing, it should be apparent that the present invention provides a safety disengagement device for a cruise control system that will operate automatically when a wide variety of possible failures or malfunctions might occur that would require such disengagement. Among the important advantages of the device is that the leads of the exclusive nor input, due to its symmetric characteristics, can be connected interchangeably with either plus or minus terminal of the brake switch on any vehicle, thereby simplifying installation procedures. Moreover, they can be readily attached to vehicles having either ground connected or positive connected brake circuits. In operation, if either input wire to the exclusive nor circuit becomes disconnected, or if the fuse burns out, or if the brake switch becomes inoperative in any way, a disconnect signal will be provided to the cruise control system. Also, even though none of the aforesaid malfunctions occur, the cruise control system will be disabled by the redundant brake circuit if the difference between the actual speed and the peak speed exceeds the preset limit.

Although the device has been described in terms of discrete elements and components, it may be desirable to combine their functions by use of a microprocessor which can provide the counters, registers, multiplexors, comparators, memory and logic required. For example, the elements shown as the control logic 14 and the redundant brake circuit 75 may be provided by a commercially available 4-bit microprocessor, such as control oriented processor No. 421, produced by National Semiconductor Co.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a vehicle having a cruise control system and a brake system including a brake switch operable by a pedal and having two contacts, one of which is connected to a power source and the other of which is connected to ground potential, said cruise control system included a logic control section with a set speed input, an actual speed input and providing an output for controlling a throttle actuator to maintain a preselected set speed, and a power lead means connecting a vehicle power bus with said throttle actuator, the improvement of an automatic disconnect device comprising:

an exclusive NOR circuit having a pair of input leads each connected to one contact of said brake switch, a pair of transistors, the base of each transistor being connected to one said input lead, the emitters of each transistor being connected to the opposite input lead, and the collectors connected in parallel to a single output lead that is connected to said control logic section;

a switching transistor in series with said power lead means and a control resistor connected between the base of said switching transistor and said output lead of said exclusive NOR circuit, said output lead normally being held at a low potential by said exclusive NOR circuit which also provides the bias necessary through said control resistor to said switching transistor to cause power to be transmitted from said vehicle power bus to said throttle actuator;

whereby when the vehicle brake switch is closed or if it malfunctions to destroy a return path to ground, said exclusive NOR circuit will cease conducting, thereby allowing said output lead to be pulled to a high potential by the lack of current through said control resistor and providing a primary disengage signal to said control logic section while also removing sufficient bias from said switching transistor to cause it to cease conduction and disconnect said power lead means from said throttle actuator, thereby poviding a secondary safety disengagement for the cruise control system.

2. The automatic disconnect device as described in claim 1 wherein said switching transistor is a PNP type.

* * * * *